United States Patent [19]

Silver et al.

[11] Patent Number: 5,701,337
[45] Date of Patent: Dec. 23, 1997

[54] SYSTEM AND METHOD FOR IMPLEMENTING A COMBINED MOBILE PHONE AND PAGER IN A TELECOMMUNICATIONS NETWORK

[75] Inventors: Andrew Silver, Cote St-Luc, Canada; Stamos Stamos, Bointon Beach, Fla.

[73] Assignee: Telefonaktiebolaget LM Ericsson (publ), Stockholm, Sweden

[21] Appl. No.: 579,005

[22] Filed: Dec. 27, 1995

[51] Int. Cl.$^6$ .................................................. H04Q 7/38
[52] U.S. Cl. ............................ 379/57; 379/58; 455/343
[58] Field of Search ........................ 379/57, 58, 59, 379/63; 455/33.1, 54.1, 38.3, 127, 343

[56] References Cited

U.S. PATENT DOCUMENTS

| | | | |
|---|---|---|---|
| H160 | 11/1986 | Focarile et al. | 379/60 |
| 4,378,551 | 3/1983 | Drapac | 340/311.1 |
| 4,661,972 | 4/1987 | Kai | 379/57 |
| 4,747,124 | 5/1988 | Ladd | 379/67 |
| 5,040,204 | 8/1991 | Sasaki et al. | 379/61 |
| 5,148,473 | 9/1992 | Freeland et al. | 379/59 |
| 5,153,903 | 10/1992 | Eastmond et al. | 379/57 |
| 5,175,758 | 12/1992 | Levanto et al. | 379/57 |
| 5,247,700 | 9/1993 | Wohl et al. | 455/33.1 |
| 5,274,843 | 12/1993 | Murai et al. | 455/38.3 |
| 5,392,452 | 2/1995 | Davis | 455/38.1 |
| 5,402,467 | 3/1995 | Watanabe | 379/57 |
| 5,418,835 | 5/1995 | Frohman et al. | 379/57 |

FOREIGN PATENT DOCUMENTS

| | | |
|---|---|---|
| 8806830 | 9/1988 | European Pat. Off. . |
| 2271915 | 4/1994 | United Kingdom . |
| 2280086 | 1/1995 | United Kingdom . |

*Primary Examiner*—Dwayne Bost
*Assistant Examiner*—William G. Trost
*Attorney, Agent, or Firm*—Smith & Catlett, P.C.

[57] ABSTRACT

A combined mobile phone and pager, and a corresponding method and network for implementing the mobile phone/pager is disclosed. The mobile phone/pager includes a mobile phone portion, which has an on/off switch. The mobile phone/pager also has a pager portion, and a relay. The relay is operationally connected to the pager portion and the on/off switch of the mobile phone portion for turning on the on/off switch upon receipt of a paging signal by the pager. A paging signal transmitted from a paging station is received through the pager portion. The pager portion then activates the relay, thereby turning on the on/off switch, and activating the mobile phone. The mobile phone portion may be turned off between calls to conserve battery power.

17 Claims, 6 Drawing Sheets

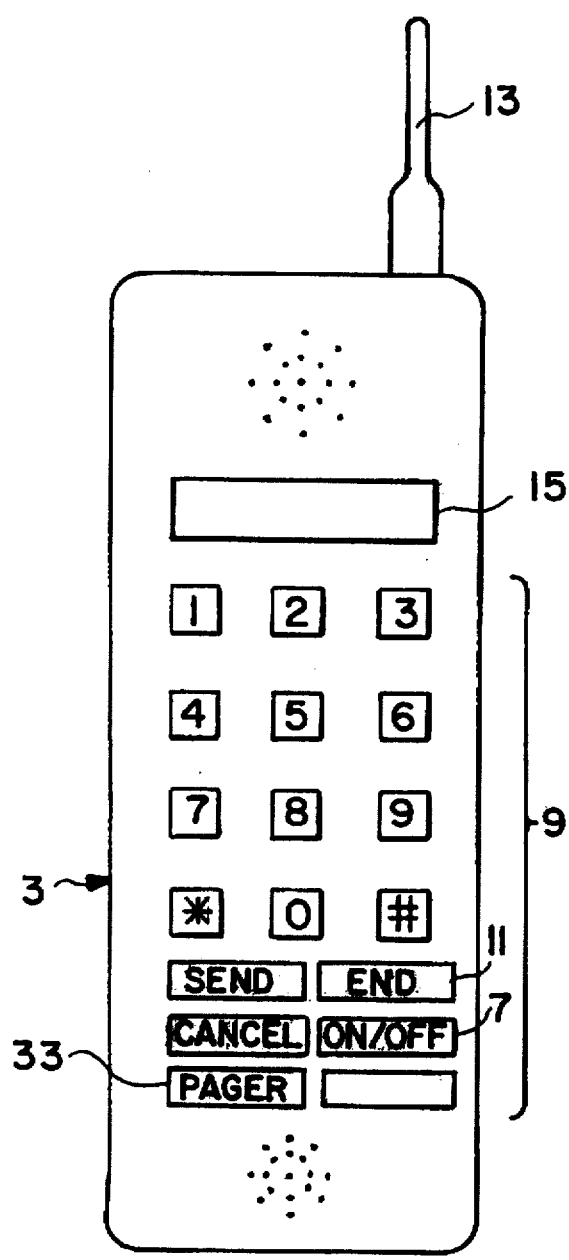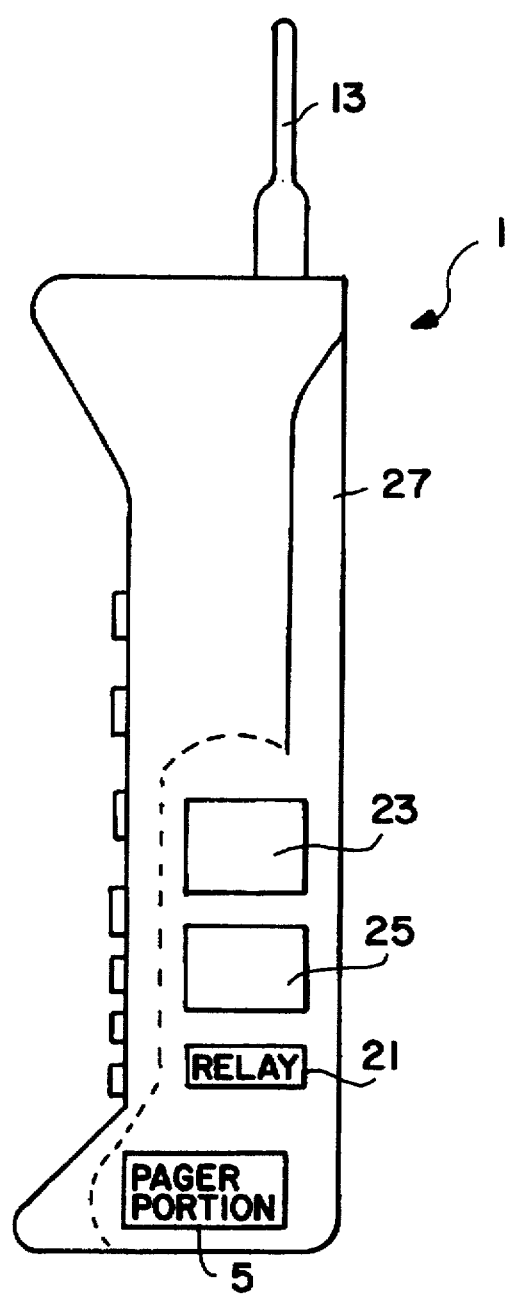

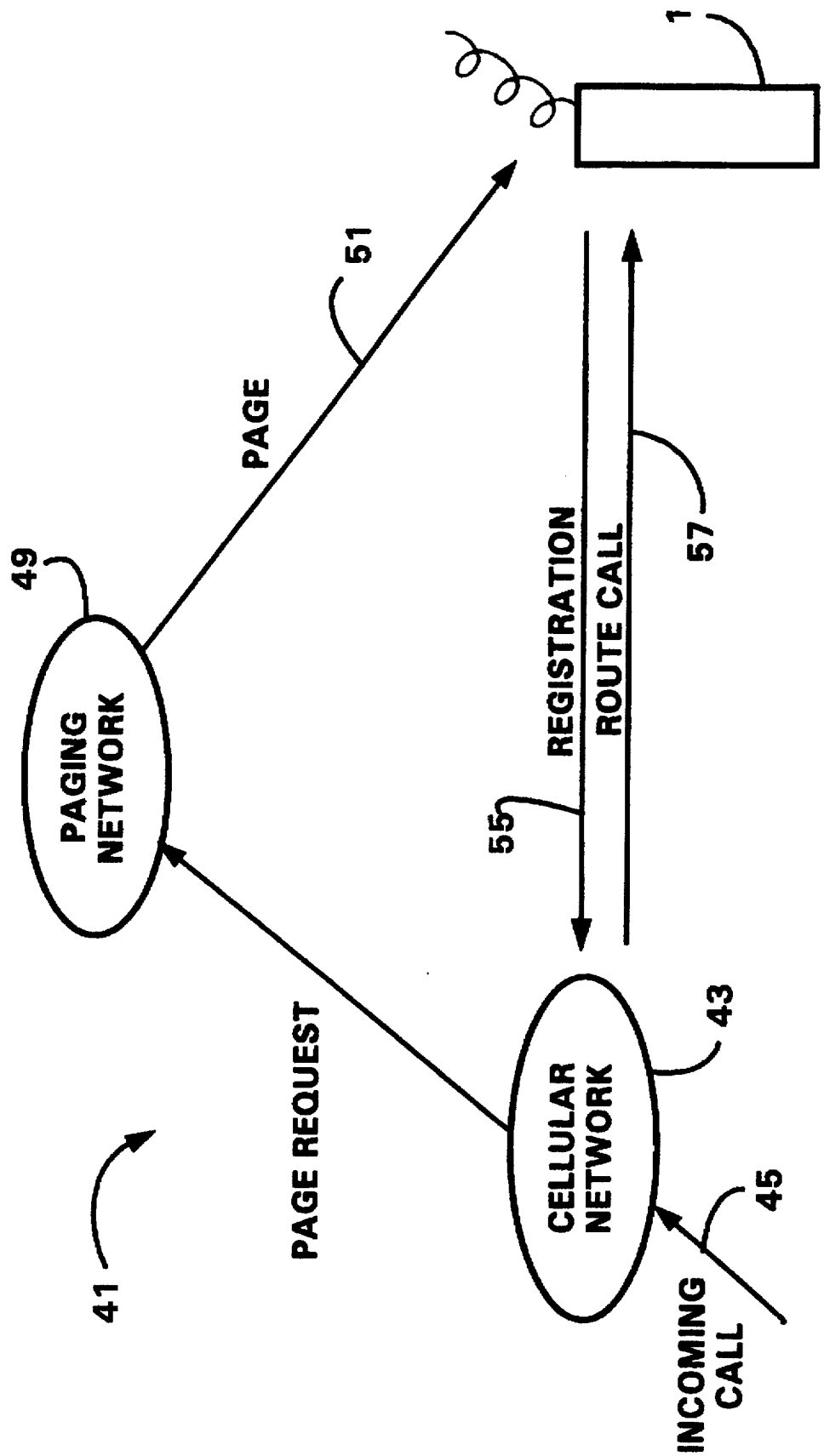

SYSTEM AND METHOD FOR IMPLEMENTING A COMBINED MOBILE PHONE AND PAGER IN A TELECOMMUNICATIONS NETWORK

BACKGROUND OF THE INVENTION

1. Field of the invention

The present invention relates to a combined mobile phone and pager, and more particularly to a system and method for implementing a mobile phone/pager in which the pager activates the mobile phone.

2. Description of Related Art

In modern mobile telecommunications systems, two major groups of products co-exists on the market: mobile telephony systems and paging systems. Mobile telephony systems are used by mobile telephone subscribers moving throughout the coverage area of the mobile telephony system utilizing mobile telephones referred to as mobile stations. The coverage area of the mobile telephony system comprises a group of cells. Each cell broadcasts over a small area and is adapted to transmit and receive communication signals with several users at the same time on an ongoing basis. When a subscriber is moving throughout different cells, the communication signals are handled sequentially by the cells in which the subscriber is passing. The communications signals are sent continuously during a call, and regularly when the mobile phone is turned on but not on a call. Of course, this continuous and regular sending of communications signals requires energy.

The second group, paging systems, typically has one wide cell which covers the whole paging area where paging subscribers can receive short message pages. The pager is always tuned on to "listen" to short message pages, and to receive the ones that are dedicated to it. Thus, a small quantity of energy is used continuously to listen, and a greater quantity of energy is used only upon receipt of an incoming short message page.

Subscribers greatly appreciate the flexibility offered by mobile telephone systems, and mobile stations are being used for an ever increasing number of applications, However, mobile stations do not offer an extensive period of power autonomy since the station is either continuously or regularly sending communications signals. On the other hand, paging systems do not offer the same flexibility as mobile stations for the types of services offered, but the power autonomy of pagers is much better than that of mobile stations. Therefore, it is a great advantage to combine the power autonomy of pagers with the flexibility of mobile stations.

Although there are no known prior art teachings of a solution to the aforementioned deficiency and shortcoming, U.S. Pat. No. 5,392,452 to Davis; U.S. Pat. No. 5,247,700 to Wohl et al.; U.S. Pat. No. 5,175,758 to Levanto et al.; U.S. Pat. No. 4,661,972 to Kai; U.S. Pat. No. 5,148,473 to Freeland et al.; and U.S. Statutory Invention Registration No. H610 discuss subject matter that bears some relation to matters discussed herein.

U.S. Pat. No. 5,392,452 to Davis discloses a selective call signalling system with combined wide area paging and high data rate transmissions via radio telephone transceivers. More precisely, this patent describes a paging system which cooperates with a radio telephone system. This combination provides conventional delivery of short paging messages via a first communication path, while a radio telephone link is used to deliver large data messages to a combined pager/radio telephone. The system of Davis reduces the paging load on the radio telephone link. Davis, however does not teach or disclose a system or a method for improving power autonomy for such combined radio telephone transceiver and pager.

U.S. Pat. No. 5,247,700 to Wohl et at., which discloses a combined mobile telephone with pager which forms an internally updated roaming pager. Mobile telephone location information is automatically conveyed by a mobile block to a paging service, thus allowing the paging service to know the location of the paging receiver, allowing in turn, the pager to wait for a page at a single frequency. Wohl thereby eliminates frequency scanning by the pager or manual updates by the user. Wohl, however, does not teach or suggest a combined mobile telephone and pager which provides greater power autonomy to the mobile telephone.

U.S. Pat. No. 5,175,758 to Levanto et al. discloses an integrated mobile telephone system and paging network in which the paging network is used to page a called mobile telephone. When calling the mobile telephone, the transmitter of the paging range in which the telephone is located, or assumed to be located, transmits a paging message to the telephone. When the telephone enters a cell of the mobile telephone system, the mobile telephone system establishes immediately a connection between the subscribers. However, Levanto does not teach or suggest a combined mobile telephone and pager which improves the power autonomy of the mobile telephone.

U.S. Pat. No. 4,661,972 to Tomokazu Kai discloses a mobile telephone system for automatically paging a mobile subscriber. This system includes a mobile telephone system and a paging system which cover an identical service area, which are independently operated, and which are connected through an exchange. A mobile telephone includes a telephone set connected to a radio transmitter/receiver and an automatic pager calling circuit, the latter having a circuit for detecting and storing an indication that an incoming call is being made to the mobile subscriber. A pager number signal for the radio tranmsitter/receiver is automatically sent by the paging system to the pager through the exchange, thereby calling the mobile subscriber. Thus, Kai reduces the paging load. However, it does not disclose or suggest a combined mobile telephone and pager which improves the mobile telephone power autonomy.

U.S. Pat. No. 5,148,473 to Freeland et al. discloses a combined pager and radiotelephone apparatus. This apparatus has a radio pager section and a mobile radiotelephone section. Received pages are stored in the pager section until the user acknowledges their receipt by a keystroke, which transfers the pages to the radio telephone section and stores them in a non-volatile memory for later use. Freeland also describes an apparatus to reduce paging load, but it does not teach or suggest a system and method to improve the mobile telephone power autonomy.

U.S. Statutory Invention Registration No. H610, published on Mar. 7, 1989 discloses a mobile pager. As it is known in the art, a special set of geographically dispersed channels in the advanced mobile phone service system are dedicated nation-wide to signalling and call control functions. These channels are used by the pager to properly configure itself to receive a page signal. The pager scans these channels, tunes to the channel with the best received signal strength and synchronizes with a received data stream on this or a second best channel. Paging service to subscribers in a mobile radio system is provided by the pager when the full service of a mobile telephone is not desired.

Alternatively, in this mobile pager, the pager is assigned the same number as an associated mobile telephone for providing a backup for telephone calls intended for the associated mobile telephone which is not "ON". This invention registration discloses an alternate paging scheme. However, it does not suggest or teach a system or method using a combined mobile telephone and pager which improves the mobile telephone power autonomy.

Several patents describe ways of reducing mobile paging load on a radio telephone link, while others describe using a pager in combination with a mobile telephone as a backup when the mobile telephone is off.

It would be a distinct advantage to have a system and method in which a mobile telephone would be combined with a pager to improve the mobile telephone power autonomy.

Review of the foregoing references reveals no teaching or suggestion of such a system and method as that disclosed and claimed herein.

SUMMARY OF THE INVENTION

In one aspect, the present invention is a mobile phone/pager. The mobile phone/pager comprises a mobile phone having an on/off switch, a pager for receiving paging signals, and a relay operationally connected to the pager and the on/off switch for turning on the on/off switch of the mobile phone upon receipt of a paging signal by the pager.

In another aspect, the present invention is a method of activating a mobile phone having an on/off switch operationally associated with a pager through a relay. The method comprises a first step of transmitting at a paging station a paging signal. Then, the transmitted paging signal is receiving through the pager operationally associated to the mobile phone. Upon receipt of the paging signal, the relay is activated, which in return turns on the on/off switch of the mobile telephone, which activates the mobile phone.

In another aspect of the present invention, there is provided a method of saving battery energy of a mobile phone having a functional independent pager operationally associated therewith through a relay which activates the mobile phone. The method comprises a first step in which, upon receipt Of a call for the mobile phone in a mobile switching center, a paging signal is transmitted. Then, the paging signal is received through the pager. In response to the receipt of the paging signal, the relay is activated, which turns on the on/off switch and activates the mobile phone. Finally, after each call, the switch of the mobile phone is turned off, which turns off the mobile telephone.

In another aspect of the invention, there is provided a mobile phone/pager network. The network comprises a pager network and a mobile phone network. The pager network comprises a plurality of pagers and a broadcasting center for broadcasting a standard paging signal upon receipt of a call to a corresponding pager. The mobile phone network comprises a plurality of mobile phones. At least one of the mobile phones has an on/off switch responsive to one of the pagers, for turning on the responsive mobile phone upon receipt of a paging signal by the pager. The mobile phone also comprises registration means. The mobile phone network further comprises at least one mobile switching center for receiving an incoming phone call for one of the plurality of mobile phones, discriminating means for differentiating the mobile phones responsive to one of the pagers and the mobile phones not responsive to one of the pagers, paging means for paging the mobile phone within the mobile phone network when the mobile phone is not responsive to one of the pagers; and bypassing means for activating the broadcasting center to page the corresponding pager when the incoming call is directed to one of the mobile phones having one of the pagers operationally connected therewith.

DESCRIPTION OF THE DRAWINGS

The invention will be better understood and its numerous objects and advantages will become more apparent to those skilled in the art by reference to the following drawings, in conjunction with the accompanying specification, in which:

FIG. 4 is a front elevational view of a combined mobile phone and pager of the present invention according to a second embodiment;

FIG. 5 is a side elevational view of the mobile phone/pager of FIG. 4 partially cut away to illustrate internal components;

FIG. 6 is a block diagram of a combined mobile phone and pager network of the present invention.

DETAILED DESCRIPTION OF EMBODIMENTS

Figure 1:
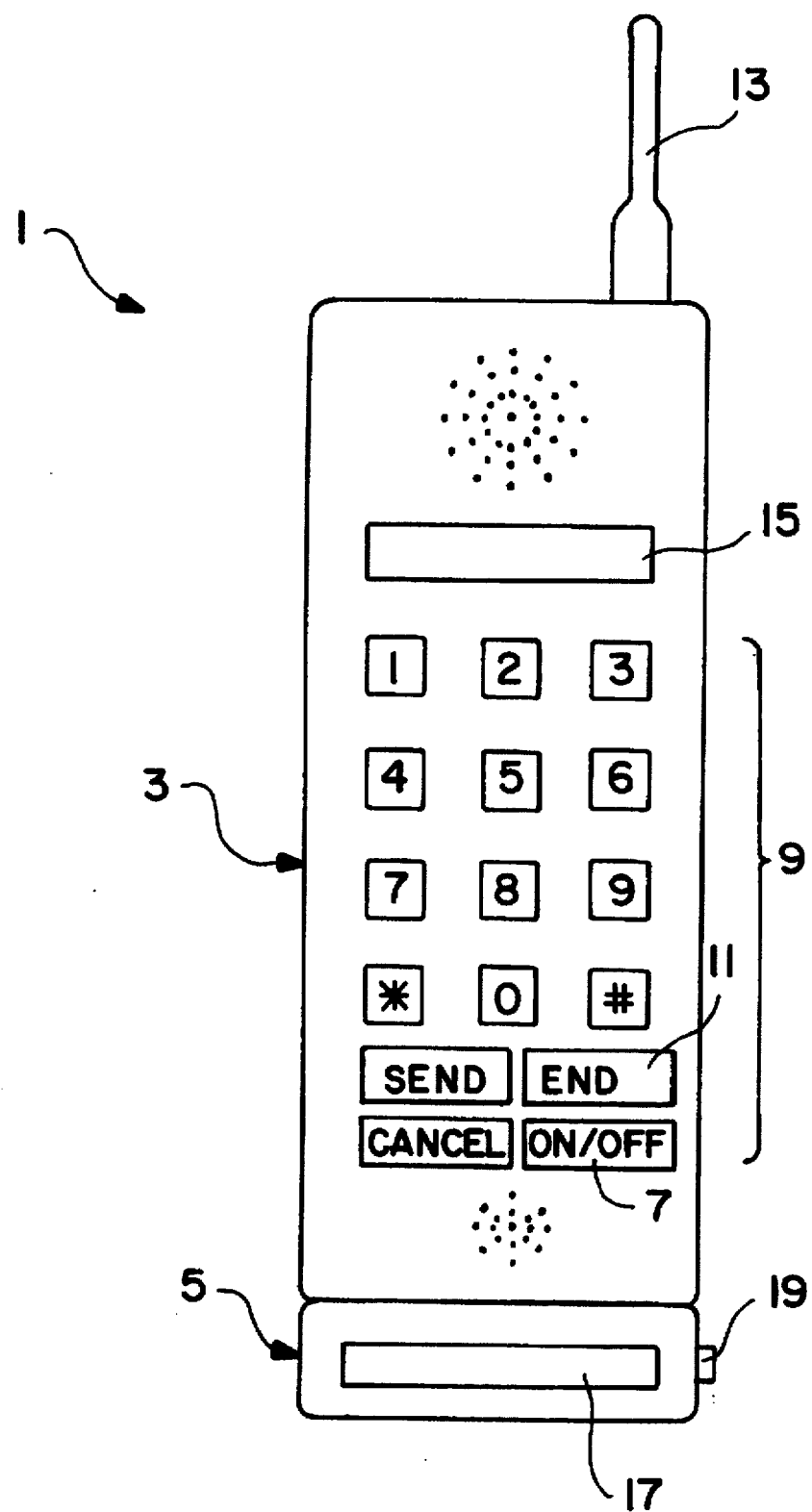
FIG. 1 is a front elevational view of a combined mobile phone and pager of the present invention according to a first embodiment.

Referring to FIG. 1, there is shown a front elevational view of a combined mobile phone and pager 1 according to a first embodiment of the present invention. The mobile phone/pager 1 has a mobile phone portion 3 and a pager portion 5.

The mobile phone portion 3 includes an on/off switch 7, a keypad 9, an end button 11, an antenna 13 and a display 15. The on/off switch 7 may be implemented as a button on the keypad 9 as shown in FIG. 1, but may also utilize other types of on/off switches. The keypad 9 may be utilized by a user to input digits of a called phone number. The display 15 may be a Liquid Crystal Display such as those widely used on mobile phones. The mobile phone portion 3 may be a portable mobile phone, a mobile car phone, a foldable mobile phone, or any other type of mobile phone known in the art. The mobile phone portion 3 may also be provided with other features and accessories without departing from the scope of the present invention.

The pager portion 5 may be a standard pager for receiving paging signals from a paging network. The pager portion 5 may optionally be equipped with a receiving display 17 and a receipt button 19. If a receiving display 17 and a receipt button 19 are provided, the receiving display 17 may indicate a phone number of a calling party or a message as is known in the paging art. The pager 5 may also have other features and accessories which are not described herein.

Figure 2:
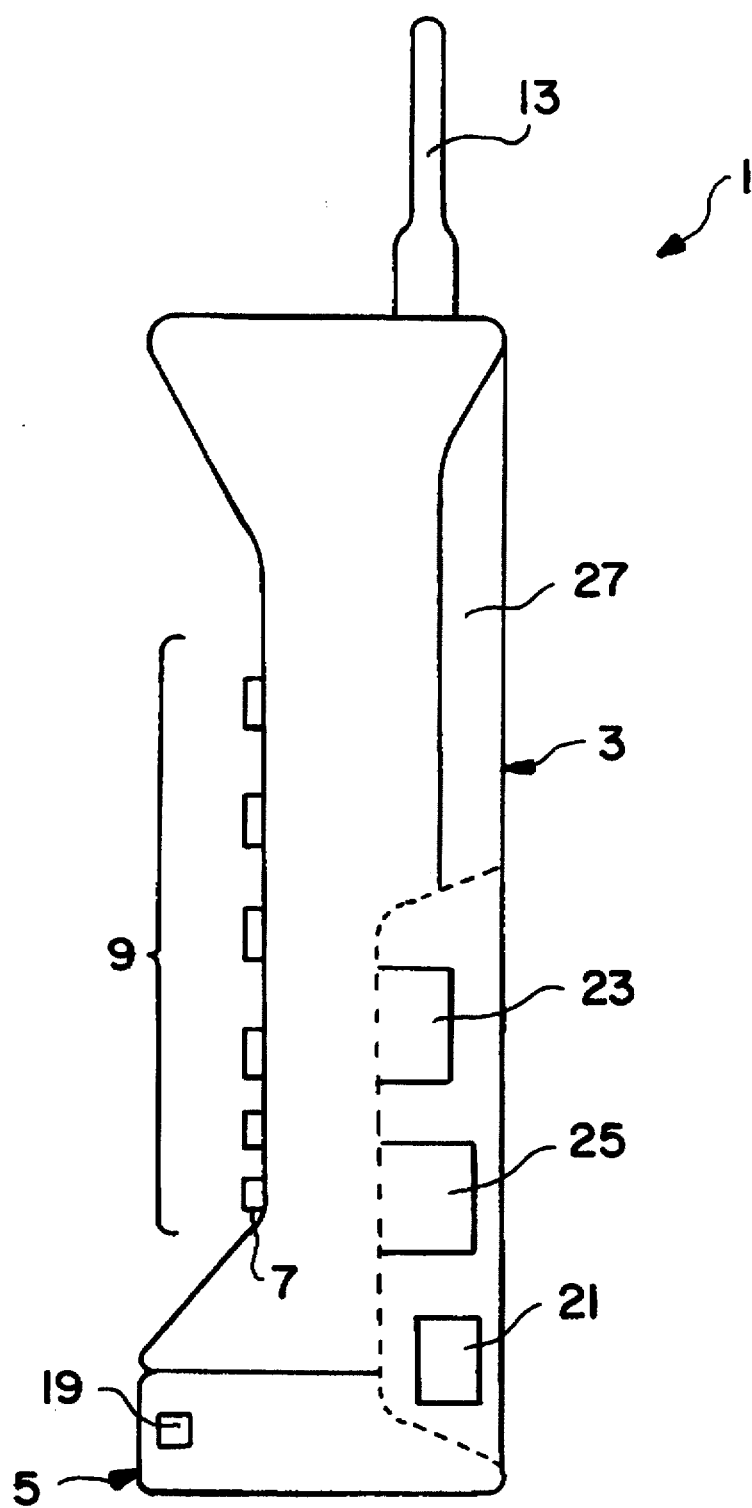
FIG. 2 is a side elevational view of the mobile phone/pager of FIG. 1, partially cut away to illustrate internal components.

Referring now to FIG. 2, there is shown a partially cut away side elevational view of the combined mobile phone/pager 1 of FIG. 1. The mobile phone portion 3 further includes a relay 21, a transmitter/receiver 23, a processor 25 and a power supply 27. The relay 21, also referred to throughout the disclosure and the claims as an activating switch, is operationally connected between the pager portion 5 and the on/off switch 7, in such a manner that the on/off switch 7 is turned on in response to the pager portion 5 receiving a paging signal. The relay 21 may comprise an electro/mechanical relay, an optical relay, an electronic relay, or any other type of relay capable of activating an electronic switch.

The transmitter/receiver 23 transmits and receives radio phone calls as is known in mobile phones. The processor 25 is connected to the keypad 9 and to the transmitter/receiver 23, where it can establish or receive a call through the transmitter/receiver 23. The power supply 27 provides energy for both the pager portion 5 and the mobile phone portion 3. The power supply 27 may be, for example, batteries, rechargeable batteries, an adaptor plugged in a car lighter, or an adaptor plugged in an electric plug. The power supply 27 may also be divided in two independent parts, with one of the parts energizing the pager portion 5, and a second part energizing the mobile phone portion 3.

Upon receipt of a paging signal by the pager portion 5, the relay 21 is activated, which turns on the mobile phone portion 3 of the mobile phone/pager 1.

Alternatively, the relay 21 may also be connected to the power supply 27 and to the pager portion 5, and upon receipt of an incoming paging signal, the relay 21 may activate energizing of the transmitter/receiver 23, the keypad 9, and the processor 25.

When the mobile phone portion 3 of the mobile phone/pager 1 is activated by the pager portion 5, the mobile phone portion 3 performs a registration procedure with a mobile telephone network.

Figure 3:
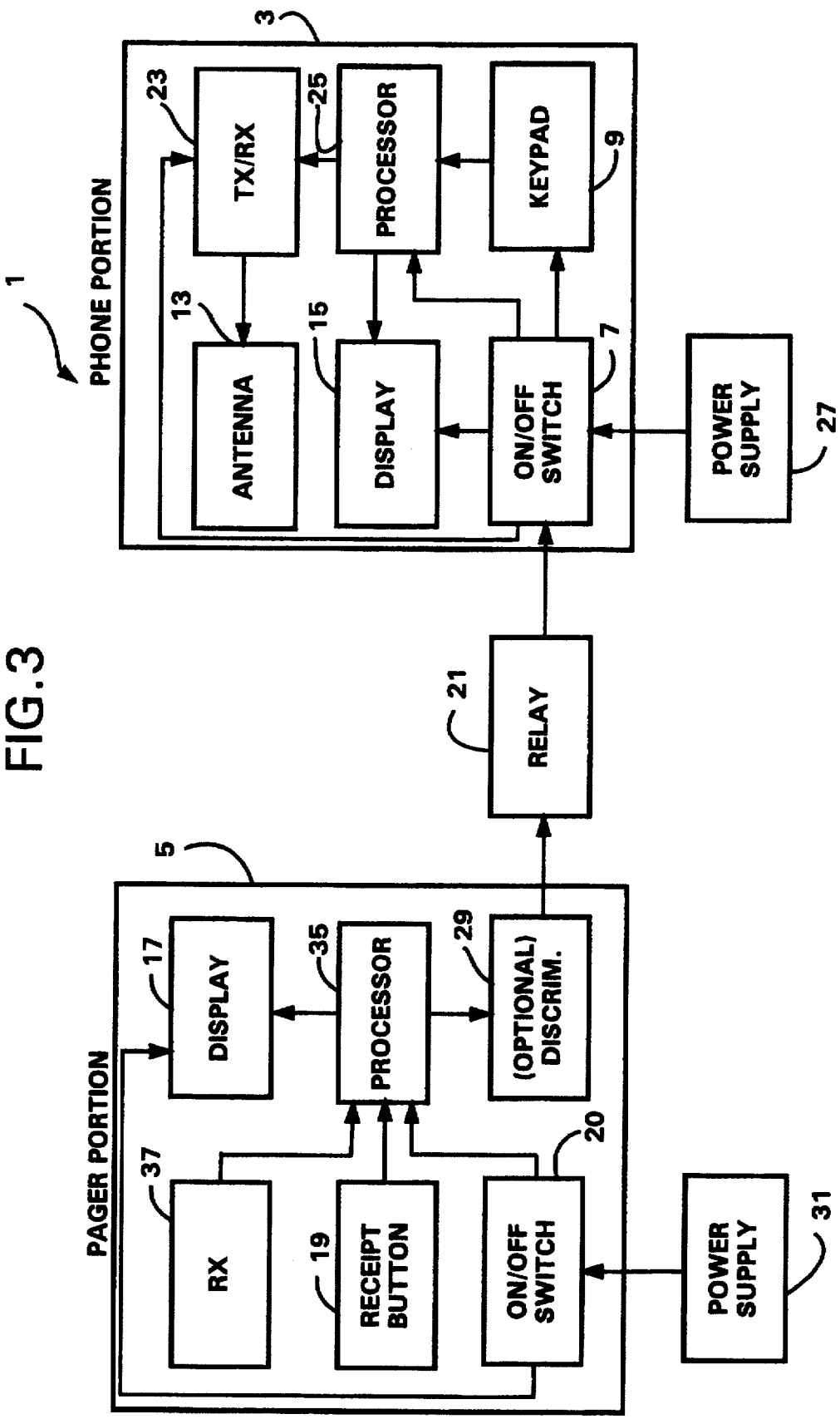
FIG. 3 is a high level block diagram of the components of the combined mobile phone/pager of FIGS. 1 and 2.

Referring now to FIG. 3, there is shown a high level block diagram of the components of the combined mobile phone/pager of the present invention. For the most part, the components are shown grouped into two blocks representing the mobile phone portion 3 and the pager portion 5. In the mobile phone portion, the on/off switch 7 is shown connected between the power supply 27, the keypad 9, display 15, transmitter/receiver 23 and processor 25. Thus, by pressing the on/off switch 7, the components of the mobile phone portion 3 may be activated. The on/off switch 7 is also connected to the relay 21, which functions to turn on the on/off switch 7 upon receipt of a paging signal by the pager portion 5. The pager portion 5 is a regular pager, and may include a display 17, a receipt button 19 and may include a discriminator 29. The pager portion 5 further includes a pager processor 35 to process the incoming paging signal and to store the paging signals if necessary. A receiver 37 is provided in the pager portion 5 to receive the paging signals. The discriminator may be added to allow use of the pager portion 5 and the mobile phone portion 3 independently. For doing so, a Mobile Paging Signal Indication Component (M.P.S.I.C.) may be added to the paging signal. The optimal discriminator 29 detects and verifies that the paging signal includes the M.P.S.I.C. before activating the relay 21 and turning on the mobile phone portion 3. If the M.P.S.I.C. is not present in the paging signal, the paging signal is treated as an ordinary paging signal and the mobile phone portion 3 is not turned on. To compensate when the power supply 27 of the mobile phone portion 3 is dead, the pager portion 5 may have an independent power supply 31, which allows the pager portion 5 to keep receiving paging signals and storing the phone number of the incoming calls, even when the power supply 27 of the mobile phone portion 3 is dead. The pager power supply 31 is connected to the pager portion through on/off switch 20.

Referring now to FIG. 4, there is shown a second embodiment of the combined mobile phone/pager of the present invention. In this second embodiment, the pager portion is integrated inside the mobile phone portion 3. To display the messages received by the pager portion to a user, a pager button 33 is added to the mobile phone portion 3. The display may be shared between the phone portion and the pager portion. Upon depression of the pager button 33, the paging message is presented on the display 15 of the mobile phone portion 3. The pager button 25 has similar functions to functions of pagers of the art, or other functions may be added as well. The display 15 may also be utilized to show the phone number of the calling party from which an incoming paging signal is received.

Referring now to FIG. 5, there is shown a partially cut side elevational view of the second embodiment of the mobile phone/pager of FIG. 4. As for the first embodiment, the integrated pager portion 5 is connected to the relay 21, which is also connected to the on/off switch 7 of the mobile phone portion 3. The mobile phone portion 3 also has, as for the first embodiment, the transmitter/receiver 23, the processor 25 and the power supply 27.

Referring to FIG. 6, there is shown a radio telecommunications network 41 in which the combined mobile phone/pager 1 of the present invention may be implemented. The radio telecommunications network 41 includes a cellular network 43 and a paging network 49. When an incoming call 45 is received in the cellular network 43, the cellular network may attempt to contact the mobile phone portion 3. This attempt may be unsuccessful if, for example, the mobile phone portion 3 is in an inactive (off) status. If the mobile phone portion cannot be contacted in the cellular network 43, the cellular network sends a page request 47 to the paging network 49 to page the pager portion 5. The paging network 49 then generates and transmits a paging signal 51.

Upon receipt of the paging signal 51, the pager portion 5 activates the mobile phone portion 3. This activation may be accomplished through a relay switch, the switch being a mechanism that causes activation of a secondary device from a first device. Upon activation, the mobile phone portion 3 sends a registration message 55 to the cellular network 43 which then routes the incoming call 45 to the mobile phone portion 3 in the normal manner.

Figure 7:
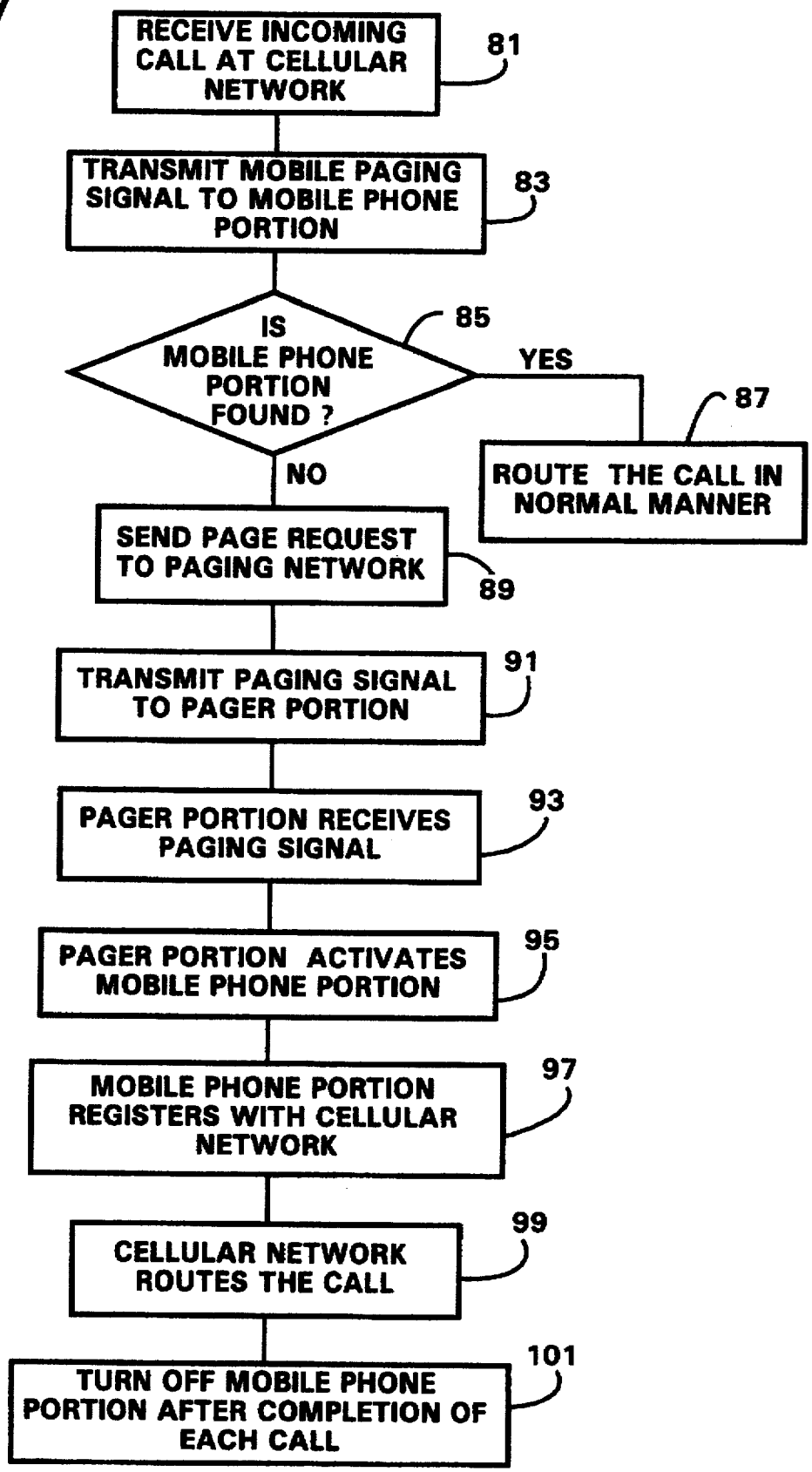
FIG. 7 is a flow chart illustrating the steps involved when the pager activates the mobile phone in accordance with the teachings of the present invention.

Referring now to FIG. 7, there is shown a flow chart of the method of the present invention. The method activates the mobile phone portion 3 of a combine mobile phone/pager 1, having the on/off switch 7 connected to the pager portion 5 through the relay 21. At step 81, an incoming call 45 for the mobile phone portion 3 is received at the cellular network 43. Upon receipt of the incoming call 45, the cellular network 43 transmits a mobile paging signal to the mobile phone portion 3 at step 83, in an attempt to locate the mobile phone in the cellular network coverage area. If the mobile phone is found at step 85, a page response from the mobile phone portion 3 is received, and the cellular network routes the call to the mobile phone portion in the normal manner at step 87.

If the mobile phone portion is not found at step 85, no page response is received, and the phone portion 3 is presumed to be in an off status. At step 89, the cellular network sends a page request to the paging network 49. At step 91, the paging network then transmits a paging signal to the pager portion 5 which is received in the pager portion at 93. The paging signal may either be a standard paging signal (i.e. the phone number of the calling party), as is known in the art, or a paging signal having a Mobile Paging Signal Indication Component (M.P.S.I.C.).

At step 95, the pager portion activates the mobile phone portion. In one embodiment, the pager portion determines whether or not the M.P.S.I.C. is present in the paging signal. If the M.P.S.I.C. is not present, the paging signal is treated as an ordinary paging signal, and the user is notified of the calling number by the pager portion 5. However, if the M.P.S.I.C. is present, the mobile phone portion 3 is activated through relay 21.

At step 97, the mobile phone portion 3 sends a power-up registration message to the cellular network. The cellular network then routes the call to the mobile phone portion in the normal manner at step 99. Finally, at step 101 the mobile phone portion 3 is turned off after the completion of each call to conserve battery power. Alternatively, the mobile phone portion 3 may be constructed so that pressing the end button 11 turns off the mobile phone portion 3.

It is thus believed that the operation and construction of the present invention will be apparent from the foregoing description. While the system, method and network showed and described have been characterized as being preferred, it will be readily apparent that various changes and modifications could be made therein without departing from the spirit and scope of the invention as defined in the following claims.

We claim:

1. A method of activating a mobile phone having an on/off switch operationally associated with a pager through a relay, the method comprising the steps of:

transmitting at a paging station a paging signal;

receiving through the pager the paging signal;

determining whether a Mobile Paging Signal Indication Component (MPSIC) is present in said paging signal;

displaying a paging message through said pager in response to receiving said paging signal, upon determining that said MPSIC is not present in said paging signal; and activating the relay in response to receiving said paging signal, upon determining that said MPSIC is present in said paging signal, thereby turning on the on/off switch, and activating the mobile phone.

2. The method of claim 1, further comprising the step of performing, by the mobile phone, a registration procedure after the mobile phone is activated.

3. The method of claim 2, further comprising the step of transmitting from a mobile telecommunications system a mobile paging signal which is delayed a predetermined time period from the transmitting of the paging signal at the paging station.

4. A method of activating a mobile phone having an on/off switch operationally associated with a pager upon receipt of an incoming call for the mobile phone, the method comprising the steps of:

receiving at a cellular network the incoming call;

sending a page request from said cellular network to a paging network;

generating and transmitting from said paging network a pager signal directed to the pager associated with the mobile phone;

receiving at the pager the pager signal;

determining whether a Mobile Paging Signal Indication Component (MPSIC) is present in said pager signal;

displaying a paging message through said pager in response to receiving said pager signal, upon determining that said MPSIC is not present in said paging signal; and turning on the mobile phone in response to receiving the pager signal, upon determining that said MPSIC is present in said paging signal.

5. The method of claim 4, further comprising after the step of receiving at the cellular network the incoming call, the steps of:

transmitting a mobile paging signal from said cellular network to the mobile phone to determine whether the mobile phone is on; and completing the call upon determining that the mobile phone is on.

6. The method of claim 4, wherein the turning on step includes starting a registration procedure.

7. The method of claim 4, wherein after the turning on step, the method further comprises a step of performing by the mobile phone a registration procedure.

8. A mobile phone/pager comprising:

a mobile phone portion having an on/off switch;

a pager portion further comprising:

means for receiving a paging signal from a paging network; and means for determining whether said paging signal includes a Mobile Paging Signal Indication Component (MPSIC);

means for displaying a paging message through said pager in response to receiving said paging signal, upon determining that said MPSIC is not present in said paging signal; and a relay operationally connected to the pager portion and the on/off switch for turning on the on/off switch of the mobile phone portion upon receipt by the pager portion of a paging signal that includes a MPSIC.

9. A mobile phone comprising:

a pager for receiving paging signals from a paging network, said pager further comprising:

means for receiving a paging signal from said paging network;

means for determining whether said paging signal includes a Mobile Paging Signal Indication Component (MPSIC); and means for displaying a paging message through said pager in response to receiving said paging signal, upon determining that said MPSIC is not present in said paging signal;

a transmitter/receiver for transmitting and receiving mobile phone calls;

a keypad for inputting digits of a phone number;

processing means connected to the keypad and the transmitter/receiver for establishing a call through the transmitter/receiver;

a power supply for providing energy to the pager, transmitter/receiver, keypad, and processing means;

an activating switch operationally connected to the power supply and the pager for activating the transmitter/receiver, keypad, and processing means; and a discriminator operationally connected to the pager and the activating switch for allowing the activating switch to activate the transmitter/receiver, keypad, and processing means only when the pager signal includes the MPSIC.

10. The mobile phone of claim 9, wherein the activating switch is a relay connected between the power supply and the transmitter/receiver, keypad and processing means, and the relay is activated by the pager upon receipt of a paging signal that includes a MPSIC.

11. The mobile phone of claim 9, wherein the pager includes a second independent power supply.

12. The mobile phone of claim 9, wherein upon activating the transmitter/receiver, keypad and processing means, the processing means and transmitter/receiver perform a registration procedure.

13. The mobile phone of claim 9, wherein the activating switch is a relay connected between the power supply and the transmitter/receiver, keypad and processing means, and the relay is activated by the pager upon receipt of a paging signal having the mobile paging indication component.

14. The mobile phone of claim 13, wherein upon activating the transmitter/receiver, keypad and processing means, the processing means and transmitter/receiver perform a registration procedure.

15. A mobile phone/pager network comprising:
 a pager network including:
  a plurality of pagers;
  means for broadcasting to said pagers a standard paging signal; and
  means for broadcasting to said pagers a paging signal that includes a Mobile Paging Signal Indication Component (MPSIC); and
 a mobile phone network connected to said pager network, said mobile phone network including:
  a plurality of mobile phones, at least one of the mobile phones having:
   an associated pager from said plurality of pagers;
   an on/off switch responsive to said associated pager for turning on the mobile phone upon receipt by said associated pager of a paging signal that includes said MPSIC; and
   a display for displaying a paging message through said associated pager in response to receiving said paging signal, upon determining that said MPSIC is not present in said paging signal; and
   means for registering with said mobile phone network;
  discriminating means for differentiating the mobile phones responsive to one of the pagers and mobile phones not responsive to one of the pagers; and
  paging means for paging the mobile phone within the mobile phone network when the mobile phone is not responsive to one of the pagers; and
  bypassing means for activating the paging network to broadcast a paging signal that includes said MPSIC to the associated pager when the incoming call is directed to one of the mobile phones responsive to one of the pagers, thereby turning on the mobile phone and activating the registering means.

16. The mobile phone/pager network of claim 15, wherein each of said plurality of pagers includes means for determining whether the MPSIC is present in the paging signal before activating the relay.

17. The mobile phone/pager network of claim 15, wherein the discriminating means also includes an associated phone number of the pager to which each responsive mobile phone is responding, said associated phone number being utilized by the bypassing means for paging the pager.

* * * * *

UNITED STATES PATENT AND TRADEMARK OFFICE
CERTIFICATE OF CORRECTION

PATENT NO. : 5,701,337
DATED      : December 23, 1997
INVENTOR(S) : Andrew Silver and Stamos Stamos It is certified that error appears in the above-identified patent and that said Letters Patent is hereby corrected as shown below:

Column 1, line 34, change "tamed" to --turned--; and
Column 3, line 43, change "Of" to --of--.

Signed and Sealed this

Seventeenth Day of March, 1998

Attest:

BRUCE LEHMAN

*Attesting Officer*           *Commissioner of Patents and Trademarks*